United States Patent
Effenberger et al.

(10) Patent No.: US 8,855,490 B2
(45) Date of Patent: Oct. 7, 2014

(54) BACKWARD COMPATIBLE PON COEXISTENCE

(75) Inventors: Frank J. Effenberger, Freehold, NJ (US); Huafeng Lin, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 1064 days.

(21) Appl. No.: 12/039,336

(22) Filed: Feb. 28, 2008

(65) Prior Publication Data

US 2009/0060507 A1 Mar. 5, 2009

Related U.S. Application Data

(60) Provisional application No. 60/969,313, filed on Aug. 31, 2007.

(51) Int. Cl.
*H04J 14/00* (2006.01)
*H04J 14/02* (2006.01)
*H04Q 11/00* (2006.01)

(52) U.S. Cl.
CPC ........ *H04Q 11/0067* (2013.01); *H04J 14/0282* (2013.01); *H04J 14/0226* (2013.01); *H04J 14/0227* (2013.01); *H04J 14/0246* (2013.01); *H04J 14/0252* (2013.01); *H04J 14/0247* (2013.01)
USPC .............. 398/66; 398/165; 398/168; 398/100

(58) Field of Classification Search
USPC ................... 398/165, 168, 66, 67, 71, 72, 100
See application file for complete search history.

(56) References Cited

U.S. PATENT DOCUMENTS

| | | | | |
|---|---|---|---|---|
| 7,254,330 B2 * | 8/2007 | Pratt et al. | ........................ | 398/67 |
| 7,330,654 B2 * | 2/2008 | Song et al. | ........................ | 398/71 |
| 7,499,651 B2 * | 3/2009 | Bouda et al. | ..................... | 398/71 |
| 7,522,838 B2 * | 4/2009 | Bouda et al. | ..................... | 398/72 |
| 7,546,036 B2 * | 6/2009 | Bouda et al. | ..................... | 398/72 |

(Continued)

FOREIGN PATENT DOCUMENTS

| | | |
|---|---|---|
| CN | 1450785 A | 10/2003 |
| CN | 1874194 A | 12/2006 |

(Continued)

OTHER PUBLICATIONS

Foreign Communication From a Related Counterpart Application—International Search Report and Written Opinion, PCT/CN2008/072185, Dec. 11, 2008, 10 pages.

(Continued)

*Primary Examiner* — Danny Leung
(74) *Attorney, Agent, or Firm* — Conley Rose, P.C.; Grant Rodolph; Jonathan K. Polk

(57) ABSTRACT

A network comprising a first optical line terminal (OLT), and a second OLT in communication with the first OLT, at least one first-type optical network unit (ONU), and at least one second-type ONU. Included is an OLT configured to implement a method comprising forwarding a first downstream data from a first-type OLT to at least one first-type ONU, and transmitting a second downstream data to at least one second-type ONU. Also included is a method comprising adding at least one second-type ONU to a passive optical network (PON) comprising a first-type OLT and at least one first-type ONU without removing the first-type OLT from the PON.

20 Claims, 3 Drawing Sheets

FIG. 2

(56) References Cited

U.S. PATENT DOCUMENTS

| | | | | |
|---|---|---|---|---|
| 7,603,036 | B2* | 10/2009 | Palacharla et al. | 398/72 |
| 7,609,967 | B2* | 10/2009 | Hochbaum et al. | 398/67 |
| 7,653,309 | B2* | 1/2010 | Bouda et al. | 398/72 |
| 7,684,705 | B2* | 3/2010 | Bouda | 398/72 |
| 7,684,706 | B2* | 3/2010 | Akasaka et al. | 398/72 |
| 7,715,719 | B2* | 5/2010 | Bouda et al. | 398/72 |
| 7,773,838 | B2* | 8/2010 | Lee et al. | 385/24 |
| 2002/0135843 | A1* | 9/2002 | Gruia | 359/167 |
| 2002/0145775 | A1* | 10/2002 | Effenberger et al. | 359/123 |
| 2004/0264961 | A1* | 12/2004 | Nam et al. | 398/58 |
| 2006/0051088 | A1* | 3/2006 | Lee et al. | 398/31 |
| 2006/0133809 | A1* | 6/2006 | Chow et al. | 398/66 |
| 2006/0153222 | A1* | 7/2006 | Van Caenegem et al. | 370/445 |
| 2007/0092254 | A1* | 4/2007 | Bouda | 398/72 |
| 2007/0183779 | A1* | 8/2007 | Bouda et al. | 398/72 |
| 2007/0189771 | A1* | 8/2007 | Kim | 398/69 |
| 2007/0212072 | A1* | 9/2007 | Iannone et al. | 398/72 |
| 2007/0274717 | A1* | 11/2007 | Xu et al. | 398/58 |
| 2007/0274718 | A1* | 11/2007 | Bridges et al. | 398/63 |
| 2008/0069564 | A1* | 3/2008 | Bernard | 398/72 |
| 2008/0138069 | A1* | 6/2008 | Bouda | 398/63 |
| 2008/0181613 | A1* | 7/2008 | Bouda | 398/98 |
| 2008/0273877 | A1* | 11/2008 | Palacharla et al. | 398/64 |
| 2009/0060507 | A1* | 3/2009 | Effenberger et al. | 398/60 |
| 2009/0175619 | A1* | 7/2009 | Effenberger et al. | 398/38 |
| 2009/0202246 | A1* | 8/2009 | Kashima | 398/77 |
| 2010/0021160 | A1* | 1/2010 | Wakayama et al. | 398/45 |
| 2010/0239247 | A1* | 9/2010 | Kani et al. | 398/41 |
| 2012/0230693 | A1* | 9/2012 | Zou | 398/66 |

FOREIGN PATENT DOCUMENTS

| | | |
|---|---|---|
| CN | 1980109 A | 6/2007 |
| WO | 2004124532 A2 | 11/2006 |
| WO | 2006124532 A2 | 11/2006 |

OTHER PUBLICATIONS

Foreign communication from a counterpart application, European application 08800697.8, Extended European Search Report dated Jun. 29, 2010, 7 pages.

Hsueh, et al., "A Highly-Flexible and Efficient Passive Optical Network Employing Dynamic Wavelength Allocation," Journal of Lightwave Technology, vol. 23, No. 1, Jan. 2005, pp. 277-286.

Hajduczenia, et al., "10G EPON Development Process," Transparent Optical Networks, 2007, ICTON 2007, IEEE, PI, Jul. 2007, pp. 276-282.

McCammon, et al., "Experimental Validation of an Access Evolution Strategy: Smooth FTTP Service Migration Path," Optical Fiber Communication Conference and Exposition National Fiber Optic Engineers Conference OFCNFOEC 2007, Anaheim, CA., Mar. 1, 2007, pp. 1-7.

Gagnaire, et al., "A New Control Plane for Next-Generation WDM-PON Access Systems," Access Networks & Workshops, 2007, ACCESSNETS '07, Second International Conference on, PI, Aug. 1, 2007, pp. 1-8.

Choi, et al., "An Efficient Evolution Method of Current TDM-PON for Next-Generation Access," Optical Internet, 2007 and the 2007 32nd Australian Conference on Optical Fibre Technology, COIN-ACOFT 2007, Joint International Conference on, Jun. 24, 2007, pp. 1-3.

Foreign Communication From a Counterpart Application, Chinese Application 200880100060.3, Chinese Office Action dated Mar. 1, 2013, 8 pages.

Foreign Communication From a Counterpart Application, Chinese Application 200880100060.3, Partial Translation of Chinese Office Action dated Mar. 1, 2013, 4 pages.

Foreign Communication from a counterpart application, Japanese application 2009552051 Office Action dated Aug. 16, 2011, 2 pages.

* cited by examiner

BACKWARD COMPATIBLE PON COEXISTENCE

CROSS-REFERENCE TO RELATED APPLICATIONS

The present application claims priority to U.S. Provisional Patent Application Ser. No. 60/969,313 filed Aug. 31, 2007 by Effenberger et al. and entitled, "Backward-Compatible PON Coexistence," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A passive optical network (PON) is one system for providing network access over "the last mile." The PON is a point to multi-point network comprised of an optical line terminal (OLT) at the central office, an optical distribution network (ODN), and a plurality of optical network units (ONUs) at the customer premises. In current PON systems, downstream data is broadcast to all of the ONUs, while upstream data is sent to the OLT using time division multiple access (TDMA) techniques. For instance, PON systems can broadcast downstream data at about 2 Gigabits per second (Gbps) using a wavelength at about 1490 nanometers (nm). The PON systems can also provide about 1 Gbps of transmission bandwidth for upstream data, which uses a wavelength of about 1310 nm.

Future PON systems are expected to deliver larger transmission bandwidths for downstream and upstream data than those delivered by the current PON systems. In addition, the future PON systems may transmit downstream and upstream data using more wavelengths. The future PON systems will be expected to coexist with the existing PON systems to reduce capital and operating costs. Such PON systems may be required to share the spectral window and avoid data collisions with the existing PON systems.

SUMMARY

In one embodiment, the disclosure includes a network comprising a first OLT, and a second OLT in communication with the first OLT, at least one first-type ONU, and at least one second-type ONU.

In another embodiment, the disclosure includes an OLT configured to implement a method comprising forwarding a first downstream data from a first-type OLT to at least one first-type ONU, and transmitting a second downstream data to at least one second-type ONU.

In yet another embodiment, the disclosure includes a method comprising adding at least one second-type ONU to a PON comprising a first-type OLT and at least one first-type ONU without removing the first-type OLT from the PON.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
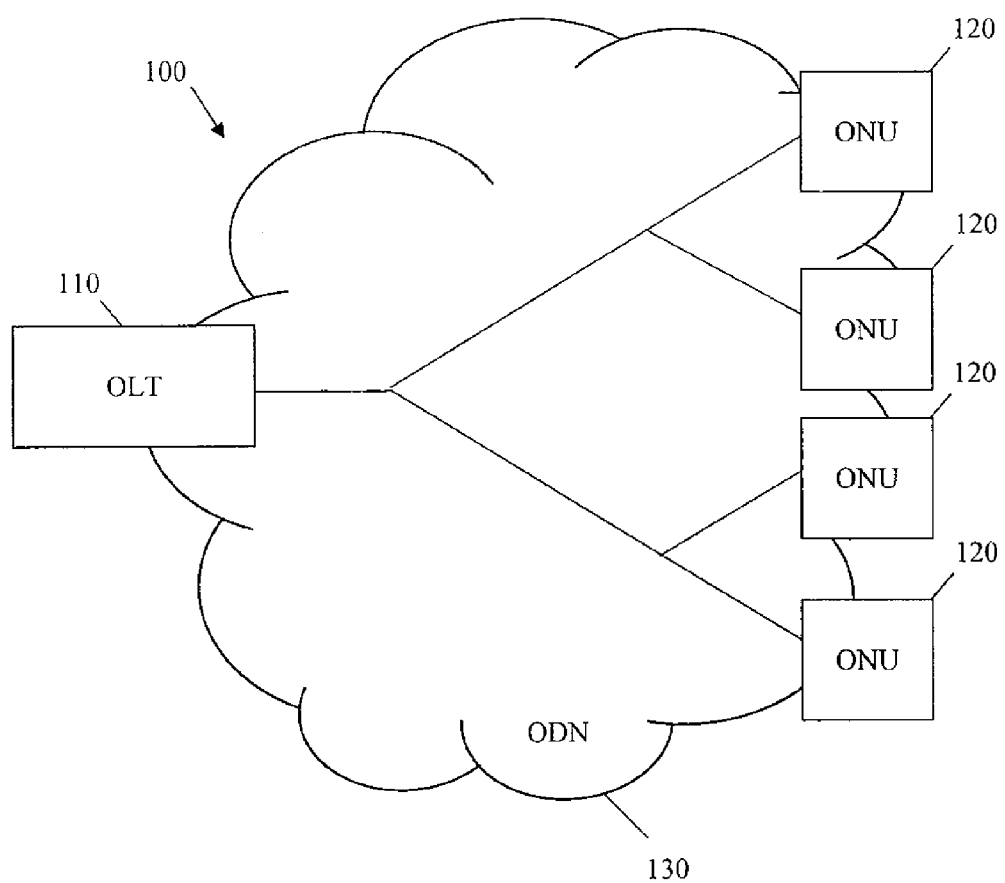
FIG. 1 is a schematic diagram of an embodiment of a PON system.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a system and method for integrating two substantially incompatible PON systems. Specifically, the disclosed system and method allow a first type of PON system to be integrated with a second type of PON system, where the integration may be performed without removing or replacing the first-type PON components. As such, the integrated PON may comprise a first-type OLT, a second-type OLT, a plurality of first-type ONUS, and a plurality of second-type ONUs. The second-type OLT may be coupled to the first-type OLT, the first-type ONUs, and the second-type ONUs. In such a configuration, the second-type OLT may forward a first-type downstream data from the first-type OLT to the first-type ONUs, as well as transmit a second-type downstream data to the second-type ONUs. The second-type OLT may also forward a first-type upstream data from the first-type ONUs to the first-type OLT, as well as receive a second-type upstream data from the second-type ONUs. In an embodiment, the first-type downstream data and the second-type downstream data use different wavelengths, whereas the first-type upstream data and the second-type upstream data use the same wavelength. Such a configuration may allow the first-type OLT to communicate with the first-type ONUs in substantially the same manner as if the second-type PON components were not present.

The first-type PON components and the second-type PON components may be from any type of PON. Examples of suitable first-type PONs include the asynchronous transfer mode PON (APON) and the broadband PON (BPON) defined by the ITU-T G.983 standard, the Gigabit PON (GPON) defined by the ITU-T G.984 standard, the Ethernet PON (EPON) defined by the IEEE 802.3ah standard, and the wavelength division multiplexing PON (WPON), all of which are incorporated by reference as if reproduced in their entirety. The second-type PON may include any PON components that are not fully compatible with the first-type PON system, and include APON, BPON, GPON, EPON, WPON, next generation access (NGA) PON, and any other PON system. As used herein, the NGA PON refers to any PON system that shares at least one wavelength with the first-type PON system.

The concepts described herein may be applied to a plurality of implementation scenarios. In one embodiment, the concepts may be applicable to the integration of second-type PON components into an existing first-type PON system. Alternatively, the concepts described herein may be applicable to the installation of a new PON system comprising a plurality of first-type and second-type PON components. It is contemplated that the concepts described herein are applicable to other scenarios as well. For purposes of illustration, the following text describes the situation where a NGA PON is integrated with an existing GPON. However, the disclosure should not be limited to this description, and instead should only be limited by the appended claims.

FIG. 1 illustrates one embodiment of a PON 100, specifically a GPON, as it may appear prior to integrating with a NGA PON system. The PON 100 comprises an OLT 110, a plurality of ONUs 120, and an ODN 130. The PON 100 is a communications network that does not require any active components to distribute data between the OLT 110 and the ONUs 120. Instead, the PON 100 uses the passive optical components in the ODN 130 to distribute data between the OLT 110 and the ONUs 120. Each of these components is described in further detail below.

One component of the PON 100 may be the OLT 110. The OLT 110 may be any device that is configured to communicate with the ONUs 120 and another network (not shown). Specifically, the OLT 110 may act as an intermediary between the other network and the ONUs 120. For instance, the OLT 110 may send data received from the other network to the ONUs 120, and send data received from the ONUs 120 to the other network. Although the specific configuration of the OLT 110 may vary depending on the type of PON 100, in an embodiment, the OLT 110 may comprise a transmitter and a receiver, as explained in detail below. When the other network is using a protocol, such as Ethernet or SONET/SDH, that is different from the communications protocol used in the PON 100, the OLT 110 may comprise a converter that converts the other network's data into the PON's protocol. The OLT 110 converter may also convert the PON's data into the other network's protocol. The OLT 110 described herein is typically located at a central location, such as a central office, but may be located at other locations as well.

Another component of the PON 100 may be the ONUs 120. The ONUs 120 may be any devices that are configured to communicate with the OLT 110 and a customer or user (not shown). Specifically, the ONUs may act as an intermediary between the OLT 110 and the customer. For instance, the ONUs 120 may send data received from the OLT 110 to the customer, and send data received from the customer to the OLT 110. Although the specific configuration of the ONUs 120 may vary depending on the type of PON 100, in an embodiment, the ONUs 120 may comprise an optical transmitter configured to send optical signals to the OLT 110. Additionally, the ONUs 120 may comprise an optical receiver configured to receive optical signals from the OLT 110 and a converter that converts the optical signal into electrical signals for the customer, such as signals in the Asynchronous Transfer Mode (ATM) or Ethernet protocol. The ONUs 120 may also comprise a second transmitter and/or receiver that may send and/or receive the electrical signals to a customer device. In some embodiments, ONUs 120 and optical network terminals (ONTs) are similar, and thus the terms are used interchangeably herein. The ONUs 120 are typically located at distributed locations, such as the customer premises, but may be located at other locations as well.

Another component of the PON 100 may be the ODN 130. The ODN 130 is a data distribution system that may comprise optical fiber cables, couplers, splitters, distributors, and/or other equipment. In an embodiment, the optical fiber cables, couplers, splitters, distributors, and/or other equipment are passive optical components. Specifically, the optical fiber cables, couplers, splitters, distributors, and/or other equipment may be components that do not require any power to distribute data signals between the OLT 110 and the ONUs 120. The ODN 130 typically extends from the OLT 110 to the ONUs 120 in a branching configuration as shown in FIG. 1, but may be alternatively configured in any other configuration.

Figure 2:
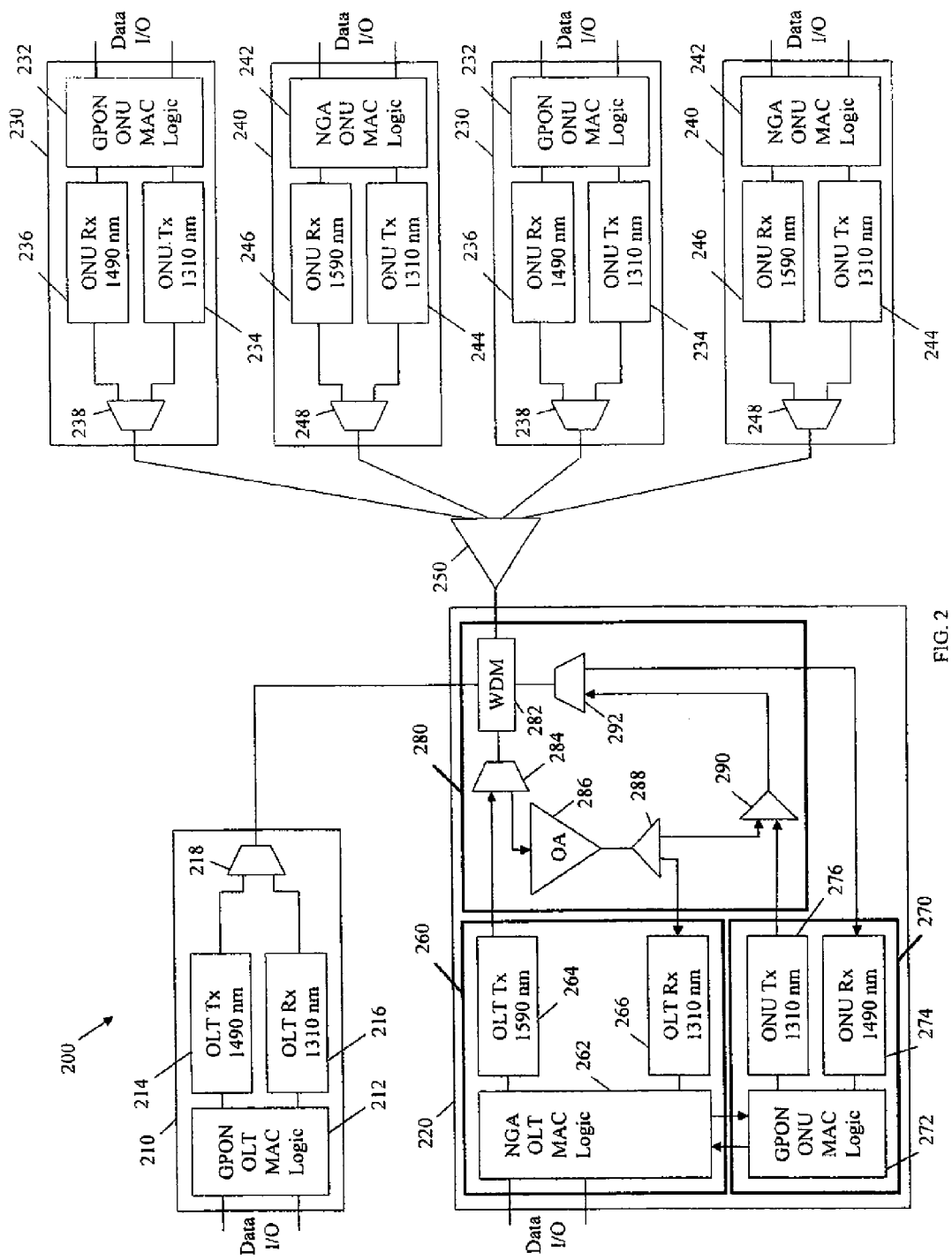
FIG. 2 is a schematic diagram of another embodiment of a PON system.

FIG. 2 illustrates an embodiment of a PON 200 as it may appear after integrating the NGA PON system with the GPON system. The PON 200 may comprise a GPON OLT 210, an NGA OLT 220, a splitter 250, a plurality of GPON ONUs 230, and a plurality of NGA ONUs 240. Although two GPON ONUs 230 and two NGA ONUs 240 are shown in FIG. 2, the PON 200 may comprise any number of GPON ONUs 230 and any number of NGA ONUs 240. Each of these components is described in further detail below.

One component in the PON 200 may be the GPON OLT 210. The GPON OLT 210 may be coupled to the NGA OLT 220 and may comprise an optical transmitter 214, an optical receiver 216, a wavelength division multiplexer (WDM) 218, and a GPON OLT media access control (MAC) logic 212. These components may allow the GPON OLT 210 to broadcast downstream data signals to the GPON ONUs 230 at about 2 Gbps using a wavelength of about 1490 nm. The GPON OLT 210 may also detect upstream data signals from the GPON ONUs 230 at about 1 Gbps using a wavelength of about 1310 nm.

The optical transmitter 214 may transmit the downstream data to the NGA OLT 220, while the optical receiver 216 may receive the upstream data from the NGA OLT 220. The WDM 218 may couple both the optical transmitter 214 and the optical receiver 216 to the NGA OLT 220 via an optical link. Specifically, the WDM 218 may route the downstream data from the optical transmitter 214 to the NGA OLT 220, and route the upstream data from the NGA OLT 220 to the optical receiver 216. The GPON OLT MAC logic 212 may send and receive data over an electrical or optical GPON interface, labeled as Data I/O in FIG. 2. The GPON OLT MAC logic 212 may format the downstream data into data frames compatible with GPON protocol and send the downstream data to the optical transmitter 214. The GPON OLT MAC logic 212 may also receive the upstream data from the optical receiver 216 and obtain the upstream data frames corresponding to the GPON ONUs 230. The upstream data frames may comprise bandwidth allocation requests from the GPON ONUs 230, which may be processed by the GPON OLT MAC logic 212 to grant each of the GPON ONUs 230 timeslots for transmitting the upstream data. The upstream data frames may also comprise a bandwidth allocation request from the NGA OLT 220 similar to that of the GPON ONUs 230, which may also be processed by the GPON OLT MAC logic 212 to grant the NGA OLT 220 at least one timeslot for upstream data transmission, as described in further detail below.

In an embodiment, the GPON OLT 210 may receive the upstream data from the GPON ONUs 230, the NGA ONUs 240, and the NGA OLT 220. In such an embodiment, the GPON OLT 210 may detect the upstream data transmitted from the GPON ONUs 230 and the NGA OLT 220, and disregard the upstream data from the NGA ONUs 240. The GPON OLT 210 may disregard the upstream data form the NGA ONUs 240 as data that cannot be processed by the GPON OLT MAC logic 212 or noise. Alternatively, the GPON OLT 210 may be configured to ignore the upstream data from the NGA ONUs 240, for example, by identifying some content in the upstream data frames as upstream data associated with the NGA ONUs 240.

Another component in the PON 200 may be the NGA OLT 220. In addition to the GPON OLT 210, the NGA OLT 220 may be coupled to the ONUs 230 and the ONUs 240, e.g. via the splitter 250. The NGA OLT 220 may comprise three components: an optical router component 280, a UPON ONU component 270, and an NGA OLT component 260, which may be coupled to each other. These components may allow the NGA OLT 220 to broadcast downstream data signals to the NGA ONUs 240 using a wavelength of about 1590 nm. The NGA OLT 220 may also detect upstream data signals that are transmitted from the NGA ONUs 240 using a wavelength of about 1310 nm. In addition, these components may allow the NGA OLT 220 to forward the downstream data from the GPON OLT 210 to the GPON ONUs 230 and forward the upstream data from the GPON ONUs 230 to the GPON OLT 210.

The optical router component 280 may comprise a four-port WDM 282, a first three-port WDM 284, an optical amplifier 286, a splitter 288, a combiner 290, and a second three-port WDM 292, which are coupled together as shown in FIG. 2. These components may allow the optical router component 280 to route the downstream and upstream data between the GPON OLT 210, the NGA OLT component 260, the GPON ONU component 270, the GPON ONUs 230, and the NGA ONUs 240. Specifically, the four-port WDM 282 may receive, without substantial signal reflection or loss, the NGA downstream data from the NGA OLT component 260 via the first three-port WDM 284. The four-port WDM 282 may then route the NGA downstream data to the NGA ONUs 240 via the splitter 250. In addition, the four-port WDM 282 may receive the GPON downstream data from the GPON OLT 210, and reflect substantially all of the optical signal towards the GPON ONUs 230. In an embodiment, the four-port WDM 282 may reflect about ninety-nine percent of the GPON downstream signals to the splitter 250 without amplifying the signal. The four-port WDM 282 may route the unreflected portion of the GPON downstream data via the second three-port WDM 292 to GPON ONU component 270. Hence, the optical router component 280 may provide the GPON ONU component 270 with a copy of the GPON downstream data from the GPON OLT 210. This allows the GPON ONU component 270 to perform the functions described herein without substantially detracting signal strength from the GPON downstream signal sent to the GPON ONUs 230.

The four-port WDM 282 may also receive, without substantial signal reflection or loss, a combined upstream data from the GPON ONUs 230 and the NGA ONUs 240. The four-port WDM 282 may route the combined upstream data stream via the first three-port WDM 284 to the optical amplifier 286. The optical amplifier 286 may amplify the upstream data and send the upstream data to the splitter 288. The splitter 288 may split the amplified upstream data into two copies that may each comprise about the same signal strength as that of the original combined upstream data. The splitter 288 may send one copy of the upstream data to the NGA OLT component 260 and send the other copy of the upstream data to the combiner 290. The combiner 290 may add the upstream data transmitted from the GPON ONU component 270 to the upstream data from the splitter 288. The combiner 290 may send the combined upstream data to the second three-port WDM 292, which forwards the combined upstream data to the four-port WDM 282. The four-port WDM 282 may then forward the combined upstream data to the GPON OLT 210.

The GPON ONU component 270 may comprise a GPON ONU MAC logic 272, an optical transmitter 276, and an optical receiver 274. The GPON ONU MAC logic 272 may send upstream data to the GPON OLT 210 via the optical router component 280. Specifically, the GPON ONU MAC logic 272 may send upstream data frames to the optical transmitter 276, which in turn may forward the upstream data to the GPON OLT 210 via the optical combiner 290, second three-port WDM 292, and the four-port WDM 282. The upstream data frames may comprise the bandwidth allocation request for upstream data by the GPON ONU component 270 to the GPON OLT 210. The optical receiver 274 may receive the upstream bandwidth allocation from the GPON OLT 210 via the four-port WDM 282 and the second three-port WDM 292. Once the upstream bandwidth allocation is received, it is passed to the NGA OLT component 260 by GPON ONU MAC Logic 272. The optical transmitter 276 may transmit the upstream data at about the same transmission wavelength (1310 nm) used to transmit the upstream data from the GPON ONUs 230. Similarly, the optical receiver 274 may receive the downstream data at about the same transmission wavelength (1490 nm) used to transmit the downstream data to the GPON ONUs 230. Thus, the communication between the GPON ONU component 270 and the GPON OLT 210 in substantially the same manner as the communication between the GPON ONUs 230 and the UPON OLT 210. In other words, the upstream data transmitted from the GPON ONU component 270 may be recognized by the GPON OLT 210 as similar to the upstream data transmitted from the other GPON ONUs 230 in the PON 200.

The NGA OLT component 262 may comprise an optical transmitter 264, an optical receiver 266, and an NGA OLT MAC logic 262. The optical transmitter 264 may be coupled to the optical router component 280 and may transmit the downstream data from the NGA OLT MAC logic 262 to the NGA ONUs 240 via the first three-port WDM 284 and the four-port WDM 282. The optical receiver 266 may be coupled to the optical splitter 288 and may receive both the NGA ONUs' upstream data and the GPON ONUs' upstream data. The optical receiver 266 may ignore the upstream data from the GPON ONUs 230 and send the upstream data from the NGA ONUs 240 to the NGA OLT MAC logic 262. Alternatively, the optical receiver 266 may pass both data streams to the NGA OLT MAC logic 262. The NGA OLT MAC logic 262 may send and receive data over an electrical or optical NGA PON interface, labeled as Data I/O in FIG. 2. The NGA PON interface may be the same type or a different type of interface as the GPON interface. The NGA OLT MAC logic 262 may format the downstream data into data frames compatible with the NGA protocol and send the downstream data to the optical transmitter 264. The NGA OLT MAC logic 262 may also receive the upstream data from the optical receiver 216 and obtain the upstream data frames corresponding to the NGA ONUs 240. The upstream data frames may comprise bandwidth allocation requests from the NGA ONUs 240. The NGA MAC logic 262 may use upstream bandwidth allocations received from the ONU component 270 to allocate upstream timeslots to each of the NGA ONUs 240. The upstream timeslots may be allocated by the GPON OLT 210 to the GPON ONU component 270, and the NGA OLT MAC logic 262 may optionally subdivide the timeslots prior to allocating the timeslots to the NGA ONUs 240. Thus, the ONUs 230, 240 communicate with the OLTs 210, 220 using TDMA techniques.

In other embodiments, the NGA OLT 220 may override the upstream data from the NGA ONUs 240 by using the combiner 290 to combine the upstream data from the NGA ONUs 240 with substantially less signal strength than that of the upstream data from the GPON ONUs 230 and the GPON ONU component 270. For instance, the signal strength of the upstream data from the NGA ONUs 240 may be attenuated and then combined with the upstream data from the GPON ONUs 230 and the GPON ONU component 270 using the combiner 290. In some embodiments, the NGA OLT 220 may comprise an additional optical switch that may be configured to route the upstream data from the GPON ONUs 230 and the GPON ONU component 270 to the GPON OLT 210 and exclude the upstream data from the NGA ONUs 240.

The GPON ONUs 230 may comprise a GPON ONU MAC logic 232, an optical receiver 236, an optical transmitter 234, and a WDM 238. These components may allow the GPON ONUs 230 to detect the downstream data broadcast from the GPON OLT 210 and transmit the upstream data to the GPON OLT 210 through the NGA OLT 220. Specifically, the GPON ONU MAC logic 232 may receive the downstream data transmitted from the GPON OLT 210 via the optical receiver 236 and send the upstream data to the GPON OLT 210 via the optical transmitter 234. The WDM 238 may be coupled to the optical receiver 236 and the optical transmitter 234 and route the downstream data transmitted at a wavelength of about 1490 nm to the optical receiver 236 and the upstream data transmitted at a wavelength of about 1310 nm from the optical transmitter 234.

The NGA ONUs 240 may comprise an NGA ONU MAC logic 242, an optical receiver 246, an optical transmitter 244, and a WDM 248. These components may allow the NGA ONUs 240 to detect the downstream data broadcast from the NGA OLT 220 and transmit the upstream data to the NGA OLT 220. Specifically, the NGA ONUs 240 may detect the downstream data broadcast from the NGA OLT 220 and transmit the upstream data to the NGA OLT 220 in a similar manner to that of the GPON ONUs 230. However, the WDM 248 may route the downstream data transmitted at a wavelength of about 1590 mm to the optical receiver 246 in addition to the upstream data transmitted at a wavelength of about 1310 nm from the optical transmitter 244.

In another embodiment of the PON 200, the GPON OLT 210, and the NGA OLT 220 may use a plurality of wavelengths to transmit the downstream and upstream data. In some instances, the GPON OLT 210 may be coupled to the NGA OLT 220 and to a subset of the GPON ONUs 230 in the PON 200 via separate links such that the NGA OLT 220 may not be coupled to the subset of GPON ONUs 230. In such cases, the downstream and upstream data may be exchanged between the GPON OLT 210 and the subset of ONUs 230 without intervention from the NGA OLT 220. The NGA OLT 220 may also be coupled to the GPON ONUs 230 and the NGA ONUs 240 via an ODN, which may comprise a plurality of splitters and other passive optical components.

Figure 3:
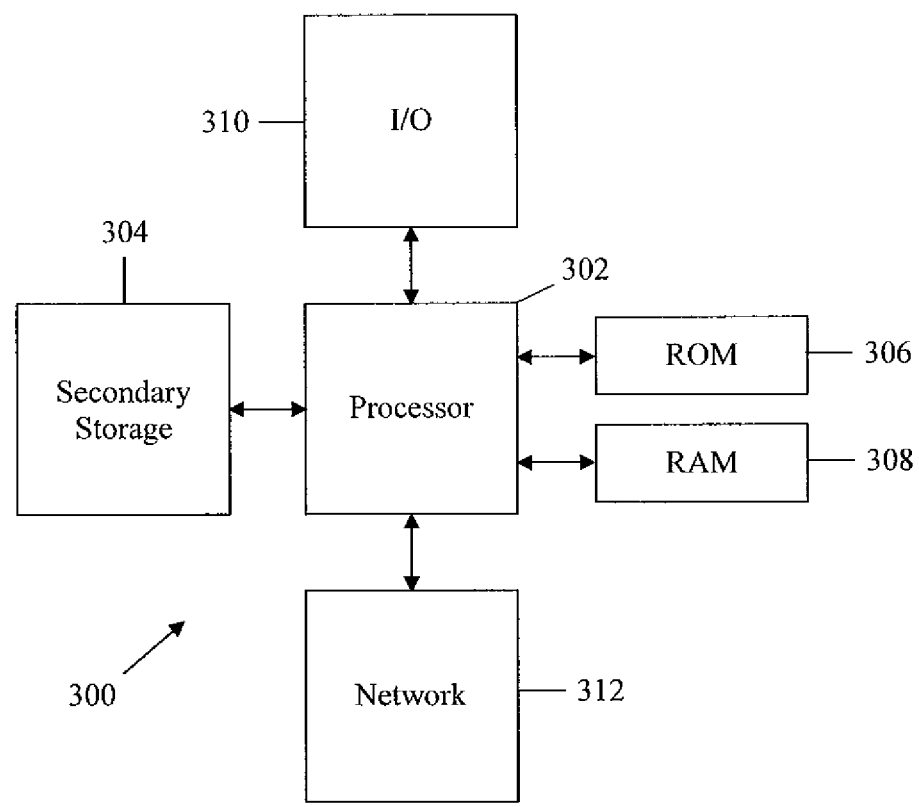
FIG. 3 is a schematic diagram of one embodiment of a general-purpose computer system.

The network components described above may be implemented on any general-purpose network component, such as a computer or network component with sufficient processing power, memory resources, and network throughput capability to handle the necessary workload placed upon it. FIG. 3 illustrates a typical, general-purpose network component suitable for implementing one or more embodiments of a node disclosed herein. The network component 300 includes a processor 302 (which may be referred to as a central processor unit or CPU) that is in communication with memory devices including secondary storage 304, read only memory (ROM) 306, random access memory (RAM) 308, input/output (I/O) devices 310, and network connectivity devices 312. The processor may be implemented as one or more CPU chips, or may be part of one or more application specific integrated circuits (ASICs).

The secondary storage 304 is typically comprised of one or more disk drives or tape drives and is used for non-volatile storage of data and as an over-flow data storage device if RAM 308 is not large enough to hold all working data. Secondary storage 304 may be used to store programs that are loaded into RAM 308 when such programs are selected for execution. The ROM 306 is used to store instructions and perhaps data that are read during program execution. ROM 306 is a non-volatile memory device that typically has a small memory capacity relative to the larger memory capacity of secondary storage 304. The RAM 308 is used to store volatile data and perhaps to store instructions. Access to both ROM 306 and RAM 308 is typically faster than to secondary storage 304.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, components, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A central office apparatus comprising:
    a first-type optical line terminal (OLT) component comprising a first-type optical transmitter and a first-type optical receiver; and
    a second-type optical network unit (ONU) component,
    wherein the apparatus is configured to couple to a first-type ONU, a second-type ONU, and a second-type OLT comprising a second-type optical transmitter and a second-type optical receiver, and
    wherein the second-type ONU component is configured to transmit to the second-type OLT first upstream data that the second-type OLT recognizes and that is in the same format as second upstream data from the second-type ONU.

2. The central office apparatus of claim 1, wherein the first-type OLT component is substantially incompatible with the second-type ONU, and wherein the second-type OLT is substantially incompatible with the first-type ONU.

3. The central office apparatus of claim 1, wherein the first-type OLT component further comprises a first-type interface, and wherein the second-type OLT further comprises a second-type interface.

4. The central office apparatus of claim 1, further comprising an optical router component coupled to the second-type ONU component and the first-type OLT component, wherein the optical router is configured to couple to the second-type OLT, the first-type ONU, and the second-type ONU.

5. The central office apparatus of claim 4, wherein the optical router component comprises a four-port wavelength division multiplexer (WDM) configured to couple to the second-type OLT, the first-type ONU, and the second-type ONU.

6. The central office apparatus of claim 5, wherein the optical router component further comprises:
    a first three-port WDM coupled to the four-port WDM and the first-type OLT component;

an optical splitter coupled to the first three-port WDM and the first-type OLT component;
an optical combiner coupled to the optical splitter and the second-type ONU component; and
a second three-port WDM coupled to the optical combiner, the second-type ONU component, and the four-port WDM.

7. The central office apparatus of claim 6, wherein the optical router component further comprises an optical amplifier located between the first three-port WDM and the optical splitter.

8. The central office apparatus of claim 6, wherein the first-type OLT component comprises a first-type OLT media access control (MAC) logic coupled to the first-type optical transmitter and the first-type optical receiver,
wherein the first optical transmitter is coupled to the first three-port WDM, and
wherein the first-type optical receiver is coupled to the optical splitter.

9. The central office apparatus of claim 6, wherein the second-type ONU component comprises:
a second second-type optical transmitter coupled to the optical combiner;
a second second-type optical receiver coupled to the second three-port WDM; and
a second-type ONU media access control (MAC) logic coupled to the second second-type optical transmitter and the second second-type optical receiver.

10. An apparatus comprising:
a first-type optical line terminal (OLT) component comprising a first-type optical transmitter and a first-type optical receiver,
wherein the apparatus is configured to couple to a first-type optical network unit (ONU), a second-type ONU, and a second-type OLT comprising a second-type optical transmitter and a second-type optical receiver,
wherein the first-type OLT component is configured to couple to a second-type ONU component,
wherein the second-type ONU component is configured to send a first bandwidth allocation request for upstream data to the second-type OLT, receive a first allocated upstream bandwidth from the second-type OLT, and pass the first allocated upstream bandwidth to the first-type OLT component,
wherein the first-type OLT component is configured to receive a second bandwidth allocation request from the first-type ONU and allocate a second upstream bandwidth received from the second-type ONU component to the first-type ONU,
wherein the second-type ONU is configured to send a third bandwidth allocation request for upstream data to the second-type OLT, receive a third allocated upstream bandwidth from the second-type OLT, and use the third allocated upstream bandwidth to communicate with the second-type OLT, and
wherein the second-type ONU component and the second-type ONU include substantially identical ONU transmitters and ONU receivers.

11. The apparatus of claim 10, wherein the first-type OLT component is substantially incompatible with the second-type ONU, and wherein the second-type OLT is substantially incompatible with the first-type ONU.

12. An apparatus comprising:
a first-type optical line terminal (OLT) component comprising a first-type optical transmitter and a first-type optical receiver; and
a second-type optical network unit (ONU) component electrically directly connected to the first-type OLT component,
wherein the apparatus is configured to couple to a first-type ONU, a second-type ONU, and a second-type OLT comprising a second-type optical transmitter and a second-type optical receiver,and,
wherein the second-type ONU component is configured to send to the second-type OLT upstream data frames comprising an upstream data bandwidth allocation request.

13. The apparatus of claim 12, further comprising an optical router component coupled to the second-type ONU component, the first-type OLT component, the second-type OLT, the first-type ONU, and the second-type ONU.

14. The apparatus of claim 13, wherein the optical router component comprises a four-port wavelength division multiplexer (WDM) configured to couple to the second-type OLT, the first-type ONU, and the second-type ONU.

15. The apparatus of claim 14, wherein the optical router component further comprises:
a first three-port WDM coupled to the four-port WDM and the first-type OLT component;
an optical splitter coupled to the first three-port WDM and the first-type OLT component;
an optical combiner coupled to the optical splitter and the second-type ONU component; and
a second three-port WDM coupled to the optical combiner, the second-type ONU component, and the four-port WDM.

16. The apparatus of claim 15, wherein the optical router component further comprises an optical amplifier located between the first three-port WDM and the optical splitter.

17. The apparatus of claim 15, wherein the first-type OLT component comprises a first-type OLT media access control (MAC) logic coupled to the first-type optical transmitter and the first-type optical receiver,
wherein the first-type optical transmitter is coupled to the first three-port WDM, and
wherein the first-type optical receiver is coupled to the optical splitter.

18. The apparatus of claim 15, wherein the second-type ONU component comprises:
a second second-type optical transmitter coupled to the optical combiner;
a second second-type optical receiver coupled to the second three-port WDM; and
a second-type ONU media access control (MAC) logic coupled to the second second-type optical transmitter and the second second-type optical receiver.

19. The central office apparatus of claim 2, wherein the first-type OLT component is substantially incompatible with the second-type ONU because the first-type OLT component communicates first data frames in a format suitable for a first protocol and the second-type ONU communicates second data frames in a format suitable for a second protocol.

20. The central office apparatus of claim 2, wherein the second-type OLT is substantially incompatible with the first-type ONU because the second-type OLT transmits downstream data at a second wavelength and the first-type ONU receives downstream data at a first wavelength.

* * * * *